Feb. 27, 1923.
G. F. STEEDE.
LIQUID LEVEL INDICATOR.
FILED OCT. 4, 1921.
1,446,944.
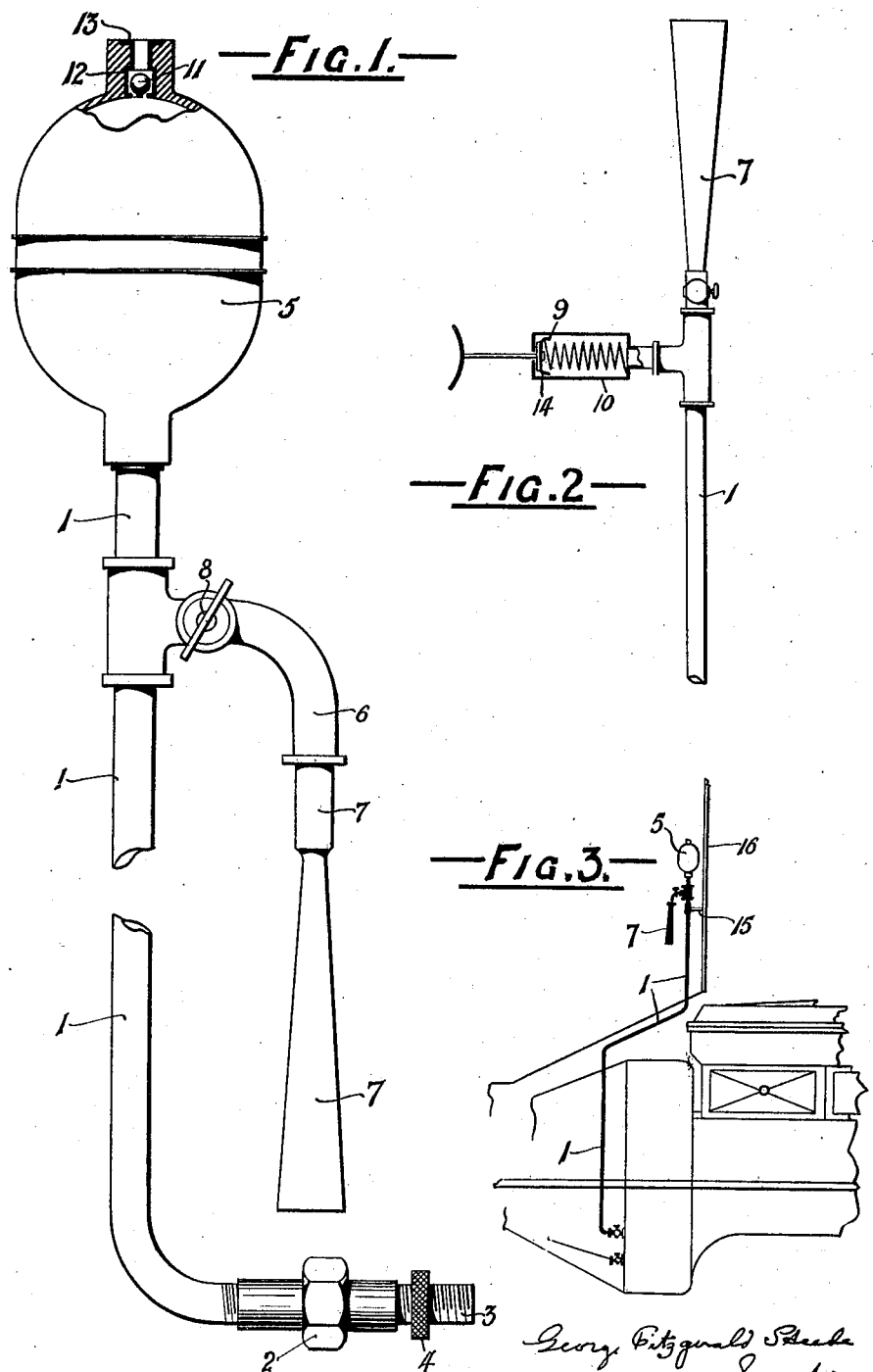

Patented Feb. 27, 1923.

1,446,944

UNITED STATES PATENT OFFICE.

GEORGE FITZ GERALD STEEDE, OF TIPPERARY, IRELAND.

LIQUID-LEVEL INDICATOR.

Application filed October 4, 1921. Serial No. 505,344.

*To all whom it may concern:*

Be it known that I, GEORGE FITZ GERALD STEEDE, a subject of the King of Great Britain, residing at Tipperary, Ireland, have invented certain new and useful Improvements in Liquid-Level Indicators, of which the following is a specification.

This invention refers to liquid level indicators particularly applicable for audibly indicating the level of lubricating oil contained in the crank cases or other equivalent containers of internal combustion engines.

The liquid level indicator to which the present invention relates is of that known type in which a tube enters a containing vessel, exteriorly of which the tube is fitted and communicates with a device, such as a whistle or the like, calculated to produce an audible signal upon an increase of air pressure in the tube, and further the tube exteriorly of the container is fitted with means, such as a compressible bulb, whereby air may be compressed in the tube and effect the sounding of the whistle when the end of the tube is closed by the liquid in said container, while compression of air in the tube cannot take place when the liquid level in the container is not sufficiently high to close the end of said tube.

Now in practice it has been found, particularly when the apparatus is used for indicating the level of lubricating oil contained in the crank case for instance of an internal combustion engine, that it is subject to certain defects which it is the object of this invention to overcome and to render the apparatus thereby perfect and certain in its action.

For instance it has been found when such a device is used for the purpose of indicating the height of heavy oil in the crank case of an internal combustion engine, that when the engine is left standing with the oil in the crank case at the proper level, and consequently with the end of the tube just entering beneath the surface of the oil, then during the standing of the machine the oil is liable to become coagulated in the lower end of the tube. In such case, after the engine has been started and has run for a time, the actual oil level in the crank case becomes lower than the end of the tube, but even then when air pressure is supplied to the tube the whistle or like audible signal will be sounded owing to the end of the tube being choked with oil, whereas the audible signal should not have sounded, and thus owing to the oil choking the end of the tube a false indication is given to the operator.

To remedy this important defect is therefore the object of the present invention, which is carried out by the means hereafter described and claimed, which permits of the closure of the exit passage from the tube to the audible signal or the like, so that the pressure air will then force any oil from the tube and ensure of a clear passage; after the tube has been thus cleared the passage to the audible signal can be opened so that the next supply of compressed air to the tube will ensure a true signal, and further the effective operation of the appliance is improved, in that when a compressible bulb or equivalent is employed for introducing pressure air to the tube, such compressible bulb or equivalent is fitted with means, such as a valve, to admit atmospheric air to the tube during its inoperative motion so that oil is not sucked into the tube.

Liquid level indicators constructed according to this invention will now be described with reference to the accompanying drawings.

Fig. 1 show the device in part sectional side elevation.

Fig. 2 is a similar view of a modified construction of the device, and

Fig. 3 is a diagrammatic view showing the device attached to the crank case of an engine of a motor car.

Referring to the drawings, 1 represent the air tube which is fitted at its lower end with a union 2, by which it is attached to a short adapter 3, which is screwed into a suitably located hole in the crank case or other oil containing receptacle of the internal combustion engine and secured therein by a locknut 4. The tube 1 is of such length that the upper end thereof may be brought up to the dash-board of the car or to any other position within easy reach of the driver, as shown in Fig. 3. In the preferred construction shown in Fig. 1, the upper end of the air tube 1 is provided with an india rubber bulb 5, and at a point slightly below the bulb 5 a branch tube 6 is fitted to the tube 1. This branch tube 6 carries on its end the whistle 7 or other sound emitting device, and is fitted with a tap or cock 8 which serves to close the connection between the whistle 7 and the air tube 1 when the preliminary pressure is being applied to the bulb 5 to clear the air tube of obstructing matter.

The bulb 5 may, if desired, be replaced by a spring pressed piston 9, operating in a cylinder 10 as shown in Fig. 2, and as is also shown in this figure the whistle 7 and tap 8 may be secured on the end of the tube 1, and the air injecting device may be carried on the branch tube 6 as shown.

For the reason already stated it is necessary that a non-return air inlet valve be provided in connection with the air injecting device, and this is shown in Fig. 1 as comprising a loose ball 11 coacting with a shoulder formed between the surrounding walls of a recess 12 and the wall of a tubular aperture 13 extending therefrom, whilst in Fig. 2 this valve is shown as comprising a cup-shaped leather washer 14 on the piston 9.

In applying the device to the internal combustion engine of a motor car, see Fig. 3, a screw threaded hole is bored in the crank case 17 or other oil retaining receptacle of the engine at, for example, a point coincident with the lowest level to which the oil may descend without fear of damage to the engine. This position for the attachemnt of the device will, with the majority of engines, have to be ascertained experimentally though in the case of engines fitted with oil overflow taps one of these may be removed and the adapter 3 fitted in place thereof. Such an arrangement is clearly shown in Fig. 3, wherein the operative parts of the device are shown supported on a bracket 15 secured to the dash-board 16.

Where however the construction of the internal combustion engine permits, the tube 1, which may be straight, is passed in a vertical direction through the top of the crank case, or through the upper part of the crank case, and fixed in such position that its lower open end is located at the proper level.

What I claim as my invention and desire to secure by Letters Patent is:—

A liquid level indicator of the character indicated, comprising a tube adapted to have one end connected in communication with a liquid container at a point coincident with the lowest level to which it is desired the liquid to descend, an air operated signal device in communication with said tube, means for forcing air from without into said tube and means for temporarily stopping the passage of air through said signal device as and for the purposes specified.

In witness whereof I have hereunto set my hand in the presence of two witnesses.

GEORGE FITZ GERALD STEEDE.

Witnesses:
 ELIZABETH M. POWELL,
 JOSEPHINE CAMPBELL.